United States Patent
Regev et al.

(10) Patent No.: US 12,063,082 B2
(45) Date of Patent: Aug. 13, 2024

(54) PSEUDO SINGULAR VALUE DECOMPOSITION (SVD) PRECODER

(71) Applicant: QUALCOMM Incorporated, San Diego, CA (US)

(72) Inventors: Aviv Regev, Tel Aviv (IL); Ronen Shaked, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 262 days.

(21) Appl. No.: 17/664,561

(22) Filed: May 23, 2022

(65) Prior Publication Data
US 2023/0403051 A1 Dec. 14, 2023

(51) Int. Cl.
H04B 7/02 (2018.01)
H04B 7/0417 (2017.01)
H04B 7/0456 (2017.01)

(52) U.S. Cl.
CPC ......... *H04B 7/0456* (2013.01); *H04B 7/0421* (2013.01)

(58) Field of Classification Search
CPC ................. H04B 7/0456; H04B 7/0421
USPC ....................................................... 375/267
See application file for complete search history.

(56) References Cited

U.S. PATENT DOCUMENTS

| 9,325,399 | B2 * | 4/2016 | Porat | H04B 7/0626 |
| 2008/0037669 | A1 * | 2/2008 | Pan | H04L 1/0014 |
| | | | | 375/267 |
| 2010/0048232 | A1 * | 2/2010 | Hwang | H04L 25/03343 |
| | | | | 455/562.1 |
| 2014/0064393 | A1 * | 3/2014 | Sun | H04B 7/0456 |
| | | | | 375/267 |
| 2017/0164367 | A1 * | 6/2017 | Manolakos | H04L 5/0051 |
| 2019/0089429 | A1 * | 3/2019 | Wei | H04B 7/0632 |
| 2021/0359731 | A1 * | 11/2021 | Sahraei | H04B 7/0465 |

FOREIGN PATENT DOCUMENTS

WO   WO 2018186778 A1 * 10/2018

* cited by examiner

*Primary Examiner* — Helene E Tayong
(74) *Attorney, Agent, or Firm* — QUALCOMM Incorporated

(57) ABSTRACT

Certain aspects of the present disclosure provide a method for wireless communications by a network entity. The method may include receiving an indication indicating a subset of one or more precoding matrix vectors associated with an estimated channel between a user equipment (UE) and the network entity. The subset of one or more precoding matrix vectors are part of a precoding matrix. The method may include calculating remaining precoding matrix vectors for the precoding matrix, based on the subset of one or more precoding matrix vectors. The method may include generating the precoding matrix based on the subset of one or more precoding matrix vectors and the remaining precoding matrix vectors. The method may include performing precoding of a downlink transmission based on the precoding matrix.

30 Claims, 14 Drawing Sheets

PSEUDO SINGULAR VALUE DECOMPOSITION (SVD) PRECODER

BACKGROUND

Field of the Disclosure

Aspects of the present disclosure relate to wireless communications, and more particularly, to techniques for generating a pseudo singular value decomposition (SVD) precoder.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by a network entity, comprising: receiving an indication indicating a subset of one or more precoding matrix vectors associated with an estimated channel between a user equipment (UE) and the network entity, wherein the subset of one or more precoding matrix vectors are part of a precoding matrix; calculating remaining precoding matrix vectors for the precoding matrix, based on the subset of one or more precoding matrix vectors; generating the precoding matrix based on the subset of one or more precoding matrix vectors and the remaining precoding matrix vectors; and performing precoding of a downlink transmission based on the precoding matrix.

Another aspect provides a method for wireless communications by a UE, comprising: estimating a channel between the UE and a network entity; calculating one or more precoding matrix vectors associated with the estimated channel; selecting a subset of the one or more precoding matrix vectors, wherein the subset of the one or more precoding matrix vectors are part of a precoding matrix; calculating remaining precoding matrix vectors for the precoding matrix, based on the subset of the one or more precoding matrix vectors; and generating the precoding matrix based on the subset of the one or more precoding matrix vectors and the remaining precoding matrix vectors.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for generating a pseudo singular value decomposition (SVD) precoder.

In a multiple-input multiple-output (MIMO) communication system (e.g., where multi-antenna transmitter communicates simultaneously with multiple receivers), a SVD precoding (e.g., transmit beamforming that involves canceling of multiuser interference by multiplying transmit signals by precoding matrix vectors) is an optimal technique to precode transmitted data to maximize a signal to noise ratio (SNR). To perform the optimal SVD precoding of transmissions, a transmitter (e.g., a network entity) has to know channel coefficients associated with a channel between the network entity and a receiver (e.g., a user equipment (UE)). So, the UE calculates and sends enormous quantity of channel and precoder data (e.g., recommended full precoding matrices) to the network entity during initial communications.

Techniques proposed herein reduce an amount of the precoder data that has to be sent from the UE to the network entity (e.g., by 25%, 50% or 75%) during the initial communications, and thereby improving transmission efficiency.

For example, the UE calculates and sends a subset of precoding matrix vectors associated with the channel to the network entity, instead of sending all precoding matrix vectors. The network entity calculates remaining precoding matrix vectors (e.g., required to generate a SVD precoder) as a deterministic function of the subset of precoding matrix vectors. The network entity and the UE may communicate in advance to select the function. The network entity generates the SVD precoder based on the received precoding matrix vectors and the generated precoding matrix vectors. In one example, to reduce 50% amount of the precoder data sent from the UE to the network entity, the UE will send two precoding matrix vectors out of total of four precoding matrix vectors to the network entity. The precoding of downlink transmissions using the generated SVD precoder may result in a low SNR loss; and a high data rate, channel capacity and spectral efficiency.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
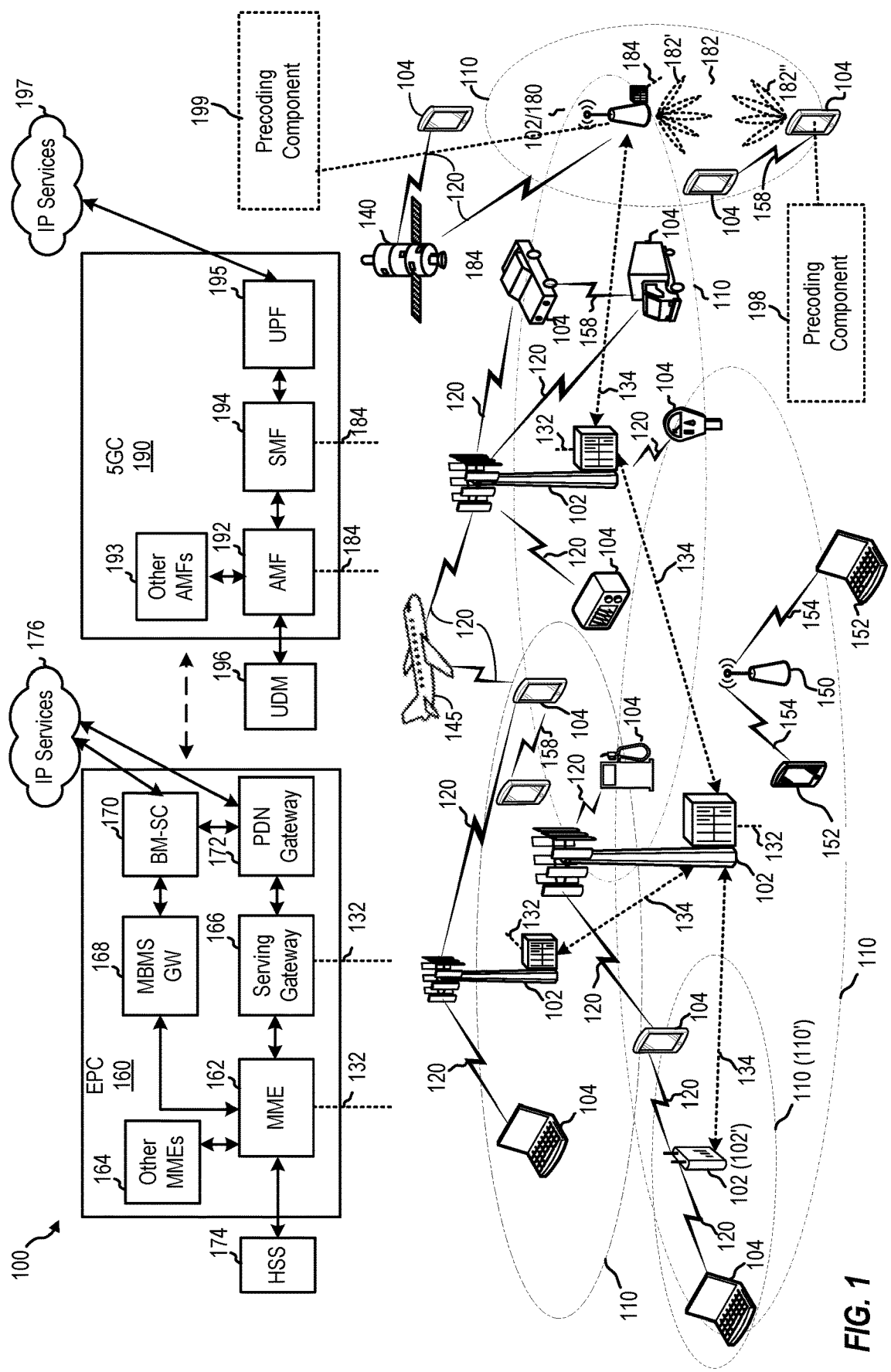
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio BS, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
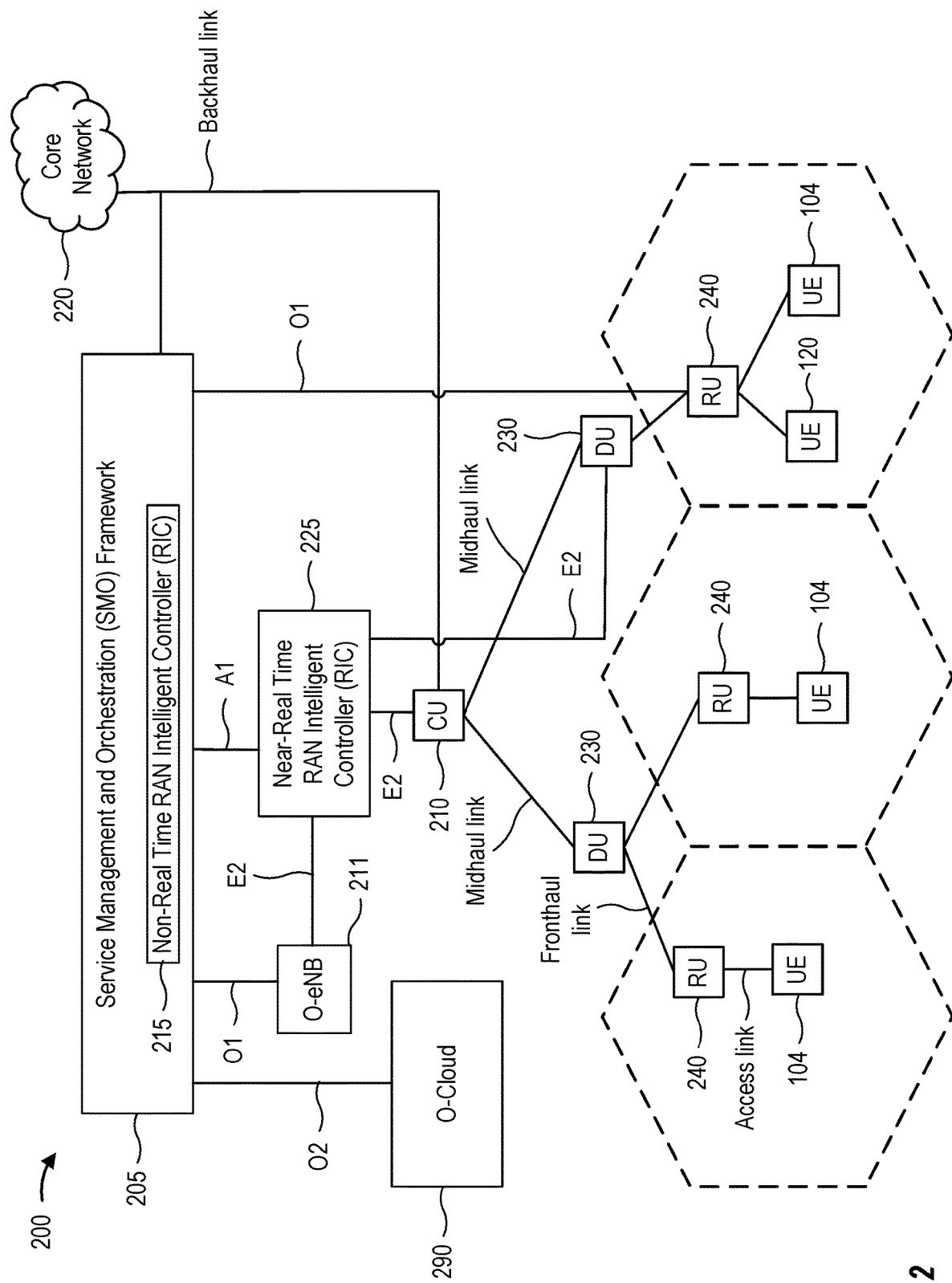
FIG. 2 depicts an example disaggregated base station (BS) architecture.

While BSs 102 are depicted in various aspects as unitary communications devices, BSs 102 may be implemented in various configurations. For example, one or more components of a BS 102 may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a BS 102 may be virtualized. More generally, a BS (e.g., BS 102) may include components that are located at a single physical location or components located at various physical locations. In examples in which a BS 102 includes components that are located at various physical locations, the various components may each perform functions such that, collectively, the various components achieve functionality that is similar to a BS 102 that is located at a single physical location. In some aspects, a BS 102 including components that are located at various physical locations may be referred to as a disaggregated radio access network (RAN) architecture, such as an Open RAN (O-RAN) or Virtualized RAN (VRAN) architecture. FIG. 2 depicts and describes an example disaggregated BS architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A BS configured to communicate using mmWave/near mmWave radio frequency bands (e.g., a mmWave BS such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain BSs (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

Figure 11:
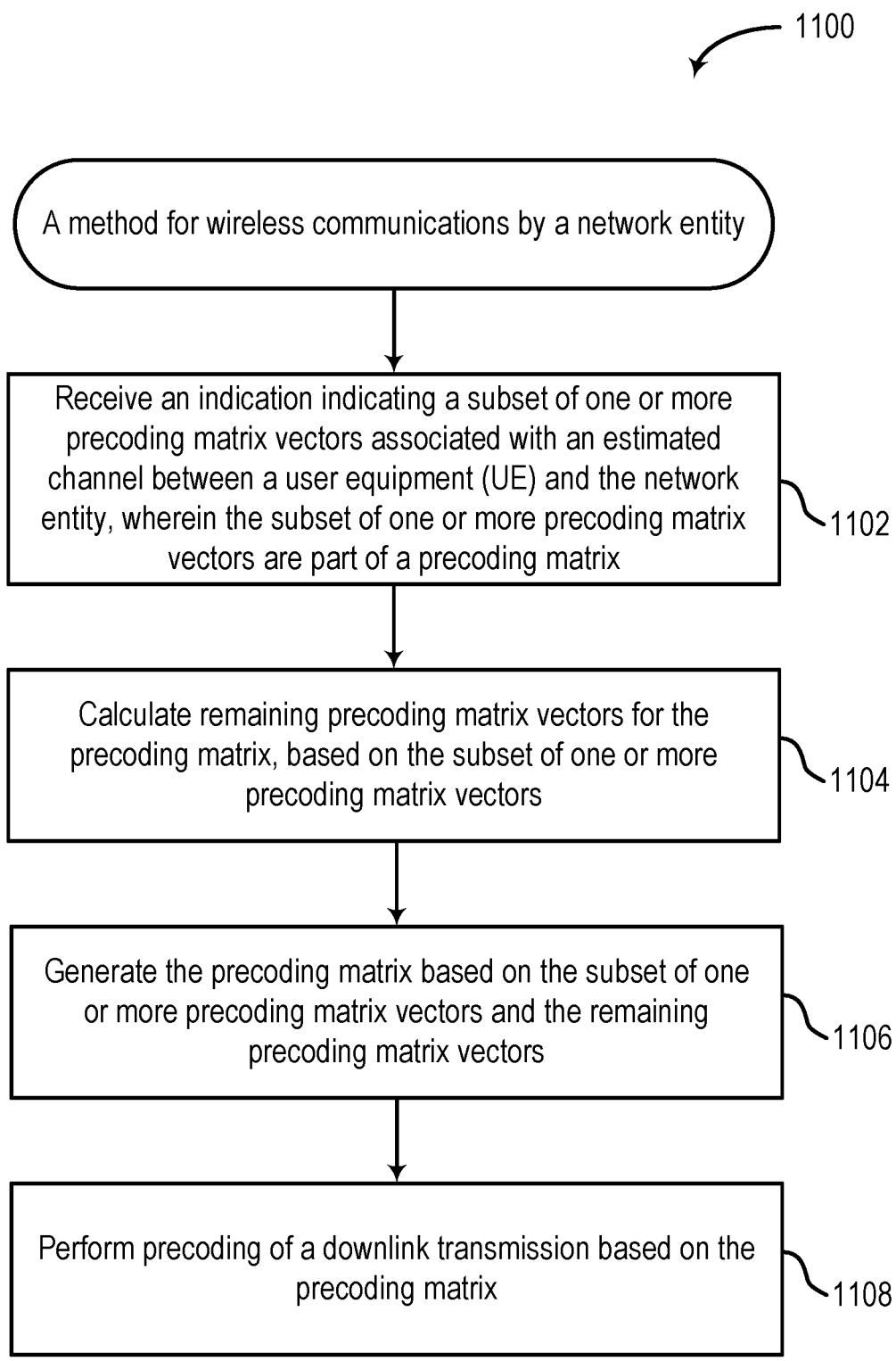
FIG. 11 depicts a method for wireless communications by a network entity.
Figure 12:
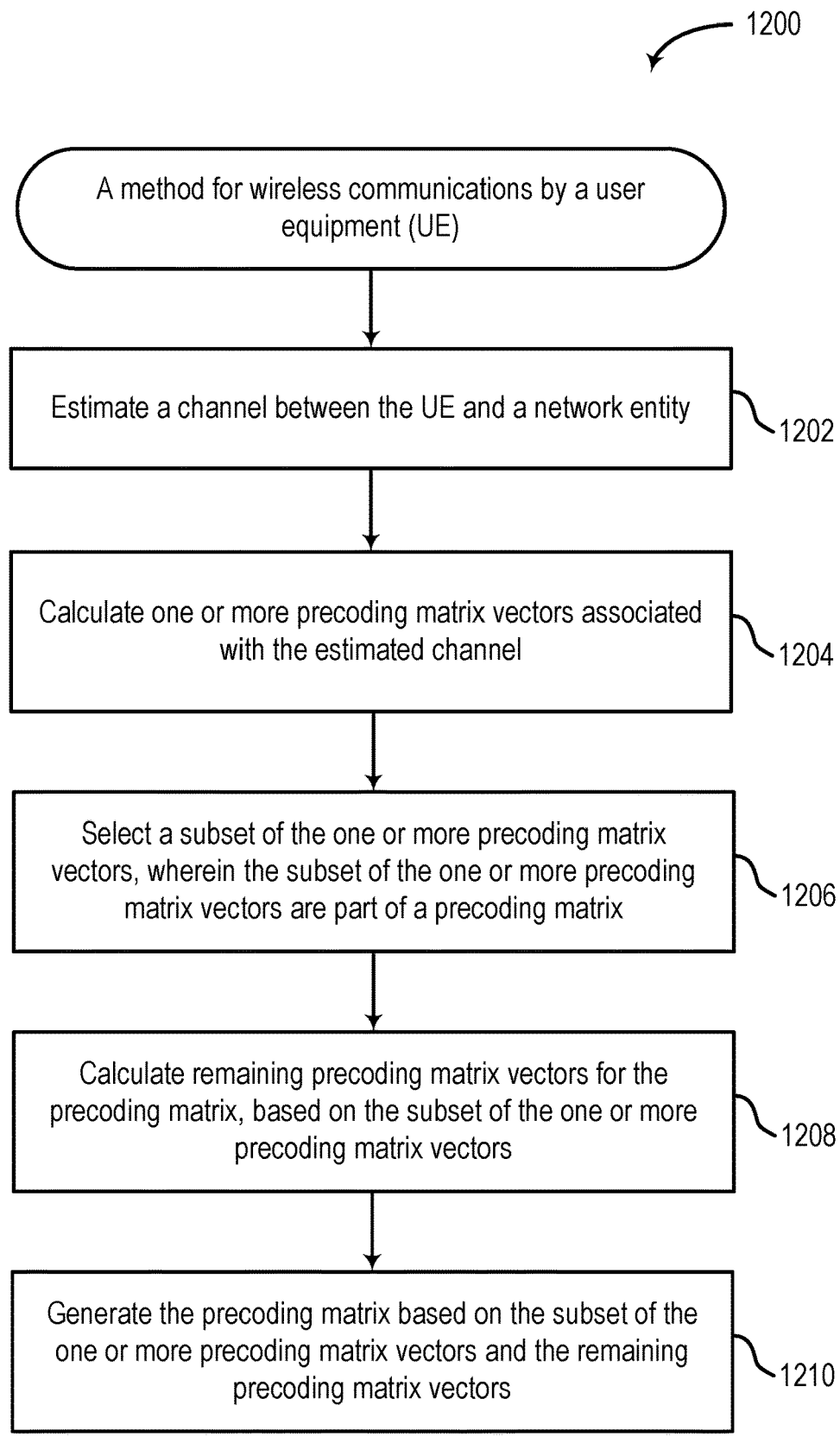
FIG. 12 depicts a method for wireless communications by a UE.

Wireless communication network 100 further includes precoding component 198, which may be configured to perform operations 1200 of FIG. 12. Wireless communication network 100 further includes precoding component 199, which may be configured to perform operations 1100 of FIG. 11.

In various aspects, a network entity or network node can be implemented as an aggregated BS, as a disaggregated BS, a component of a BS, an integrated access and backhaul (IAB) node, a relay node, a sidelink node, to name a few examples.

FIG. 2 depicts an example disaggregated BS 200 architecture. The disaggregated BS 200 architecture may include one or more central units (CUs) 210 that can communicate directly with a core network 220 via a backhaul link, or indirectly with the core network 220 through one or more disaggregated BS units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more BS functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
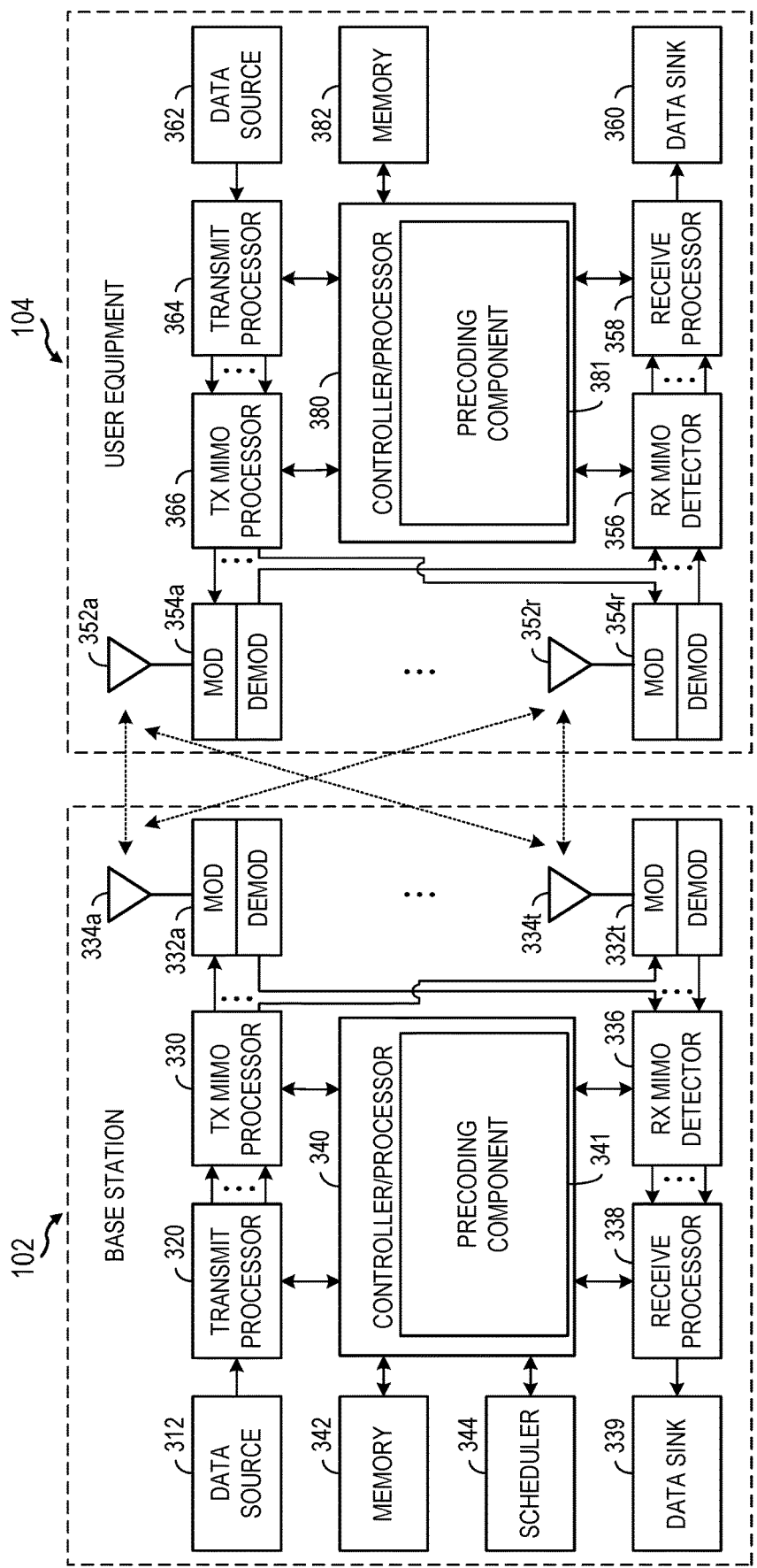
FIG. 3 depicts aspects of an example BS and an example user equipment (UE).

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

BS 102 includes controller/processor 340, which may be configured to implement various functions related to wireless communications. In the depicted example, controller/processor 340 includes precoding component 341, which may be representative of precoding component 199 of FIG. 1. Notably, while depicted as an aspect of controller/processor 340, precoding component 341 may be implemented additionally or alternatively in various other aspects of BS 102 in other implementations.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

UE 104 includes controller/processor 380, which may be configured to implement various functions related to wireless communications. In the depicted example, controller/processor 380 includes precoding component 381, which may be representative of precoding component 198 of FIG. 1. Notably, while depicted as an aspect of controller/processor 380, precoding component 381 may be implemented additionally or alternatively in various other aspects of UE 104 in other implementations.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
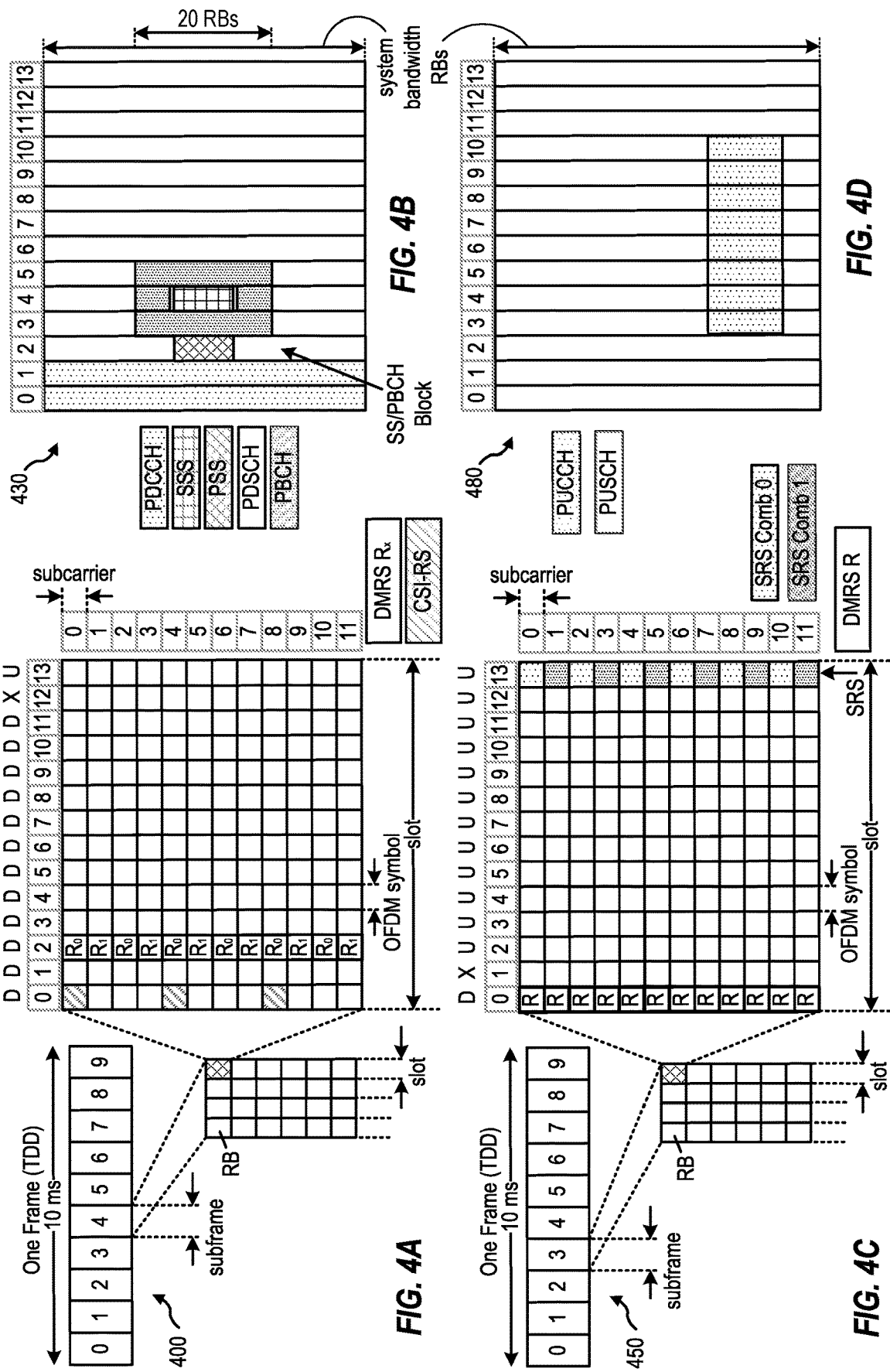
FIGS. 4A, B, C, and D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIGs), and/or paging messages.

As illustrated in FIG. 4C, some of the REs carry DMRS (indicated as R for one particular configuration, but other DMRS configurations are possible) for channel estimation at the BS. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a BS for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Multiple-Input Multiple-Output (MIMO) System

Multiple-input multiple-output (MIMO) is a multi-antenna technology that exploits multipath signal propagation so that information-carrying capacity of a wireless link can be multiplied by using multiple antennas at a transmitter node and a receiver node to send multiple simultaneous streams. At a multi-antenna transmitter node, a precoding technique (e.g., scaling the respective streams' amplitude and phase) is applied (e.g., based on known channel state information (CSI)). At a multi-antenna receiver node, the different spatial signatures of the respective streams (e.g., known CSI) can enable the separation of these streams from one another.

For example, a network entity may include multiple antennas supporting MIMO technology. The use of MIMO technology enables the network entity to exploit spatial domain to support spatial multiplexing, beamforming, and transmit diversity. The spatial multiplexing may be used to transmit different streams of data simultaneously on a same frequency. The data steams may be transmitted to a single user equipment (UE) to increase a data rate or to multiple UEs to increase overall system capacity. This is achieved by spatially precoding each data stream (i.e., applying a scaling of an amplitude and a phase) and then transmitting each spatially precoded stream through multiple transmit antennas on a downlink. The spatially precoded data streams arrive at the UEs with different spatial signatures, which enables each of the UEs to recover the one or more data streams destined for that UE. On uplink, each UE transmits a spatially precoded data stream, which enables the network entity to identify the source of each spatially precoded data stream.

The performance of a MIMO system is related to a received signal-to-interference-and-noise ratio (SINR) and correlation properties of a multipath channel and antenna configuration. Using precoding techniques, the MIMO system can increase and/or equalize the received SINR across the multiple receive antennas. The transmitter node can utilize a plurality of complex weighting precoding matrices to precode the streams of a MIMO channel. The precoding matrices can be defined in a codebook where each precoding matrix can be identified by a precoding matrix index (PMI). When the codebook is known to both the transmitter node and the receiver node, the receiver node can inform the transmitter node to use a certain precoding matrix by sending the PMI of the desired precoding matrix to the transmitter node.

Example Transmission of Precoder Data

In a multiple-input multiple-output (MIMO) system, a singular value decomposition (SVD) precoding is an optimal technique to precode transmitted data to maximize a signal to noise ratio (SNR). However, to perform the SVD precoding, a transmitter node has to know channel coefficients associated with a channel between the transmitter node and a receiver node. To attain such information, the receiver node has to send a feedback to the transmitter node. The feedback indicates a recommended precoding matrix for each precoding group (PRG) based on a channel estimation between the transmitter node and the receiver node.

The receiver node transmits the feedback (e.g., recommended precoding matrices) to the transmitter node to improve the SNR. However, in some cases, precoders (e.g., based on the precoding matrices) may also be necessary for allowing the receiver node to run non-linearity cancellation (e.g., by means of a digital post-distortion (DPoD) technique). For example, the non-linearity may occur in the transmitter node power amplifier (PA), which may be located between a precoder P and a physical channel H. In such cases, the non-linearity correction requires knowledge of both the physical channel H and the precoder P in separate. The receiver node may use information associated with the precoders to isolate the physical channel H from a conventional channel estimation H*P.

Figure 5:
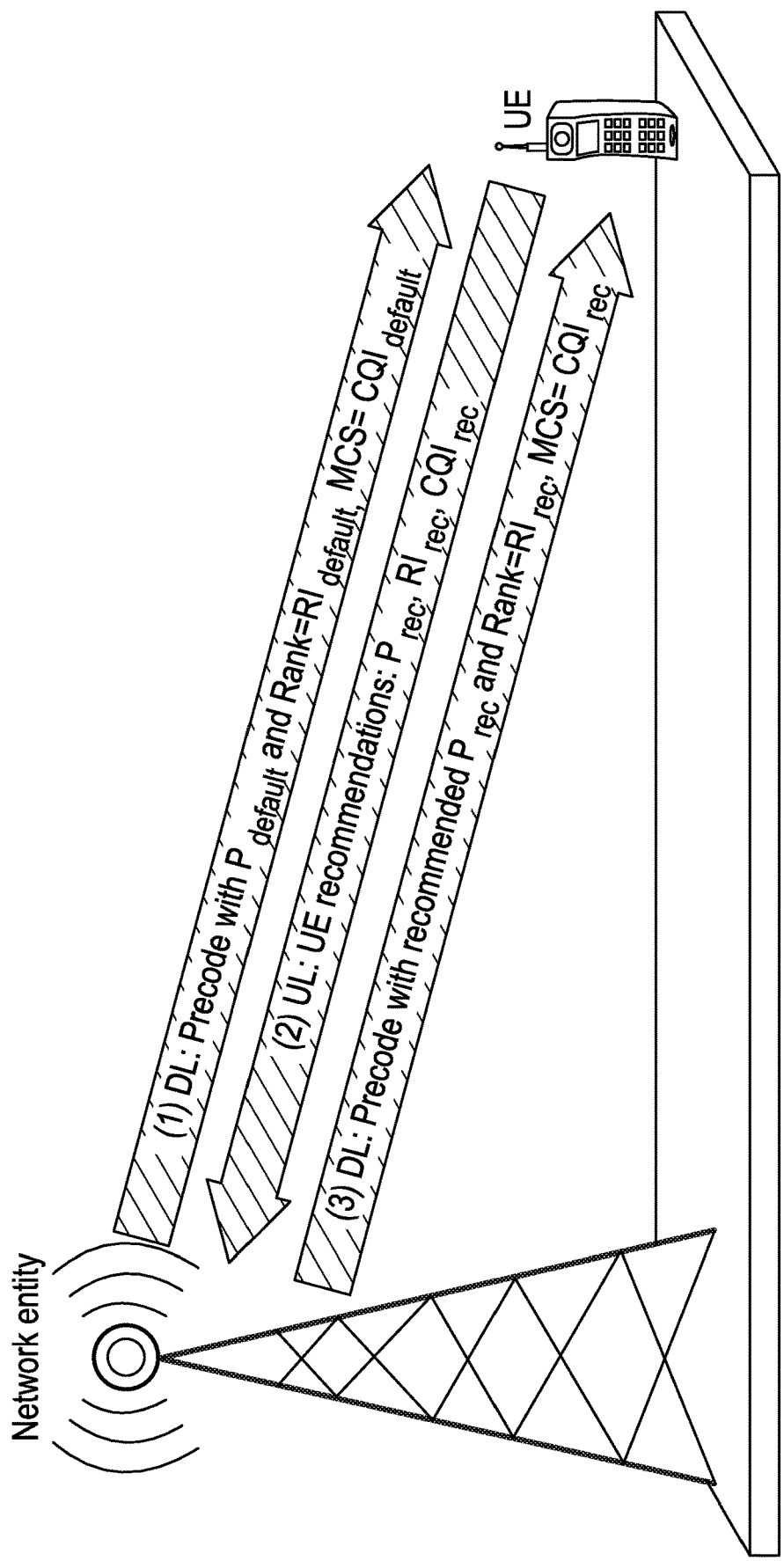
FIG. 5 depicts example communication between a UE and a network entity based on a known precoder to both the UE and the network entity.

The receiver node may send the feedback to the transmitter node in multiple ways. For example, as illustrated in FIG. 5, a network entity (e.g., gNB) and a UE may have initial communications. During the initial communications, the network entity sends a downlink transmission (e.g., channel state information (CSI)—reference signal (RS)) to the UE. The initial communications may be based on a precoder (e.g., $P_{default}$), which is known to both the network entity and the UE.

On receiving the downlink transmission, the UE calculates CSI parameters (e.g., quantities related to a state of a channel) based on the downlink transmission. The CSI parameters may include channel quality indicator (CQI), precoders (e.g., precoding matrix indicator (PMI) for MIMO scenarios), and rank indicator (RI). The UE reports the CSI parameters to the network entity as a feedback (e.g., channel state feedback (CSF)).

Upon receiving the feedback, the network entity signals to the UE information indicating when the network entity plans to adopt received recommendations of the CSI parameters. The network entity then schedules downlink transmissions (e.g., such as modulation and coding scheme (MCS), code rate, number of transmission layers, and MIMO precoding) accordingly. This process is repeated between the UE and the network entity every N slots (e.g., as function of a channel variation).

In the above noted communications between the network entity and the UE, the UE has to send enormous quantity of data (e.g., related to the precoders) via the feedback to the network entity. In one example case, a number of streams (N_ss) is equal to 4, a number of transmit antennas (N_Tx) is equal to 8, a number of receive antennas (N_Rx) is equal to 8, a number of precoding groups (PRGs) is equal to 4, and a number of resource blocks (RBs) is equal to 273. In this example case, the UE has to transmit to the network entity via the feedback 69 precoding matrices per slot (e.g., 273 RBs/4 PRGs) where a size of a precoding matrix is equal to 8 (N_Tx) rows and 4 (N_ss) columns. As a result, the feedback from the UE to the network entity will include 70 Kbits of precoder data (e.g., 8×4×69×(a number of bits per precoding matrix entry=32 bit)).

Aspects Related to Pseudo Singular Value Decomposition (SVD) Precoder

Aspects of the present disclosure provide apparatuses, methods, processing systems, and computer-readable mediums for reducing an amount of precoder data sent from a user equipment (UE) to a network entity (e.g., by 25%, 50% or 75%) during initial communications, and thereby improving transmission efficiency.

For example, the UE calculates and sends a subset of precoding matrix vectors to the network entity via a feedback, instead of sending all precoding matrix vectors. The remaining precoding matrix vectors required to generate a precoding matrix are calculated by both the network entity and the UE as a deterministic function of the subset of precoding matrix vectors. In one example, to reduce 25% amount of precoder data sent from the UE to the network entity, the UE will only include three precoding matrix vectors out of total of four precoding matrix vectors for each precoding resource block group (PRG) in the feedback.

The precoding of downlink transmissions using techniques proposed herein (e.g., that reduce the amount of the precoder data sent from the UE to the network entity) may result in a higher data rate, channel capacity and spectral efficiency. The techniques may be understood with reference to the FIGS. 6-12.

Figure 6:
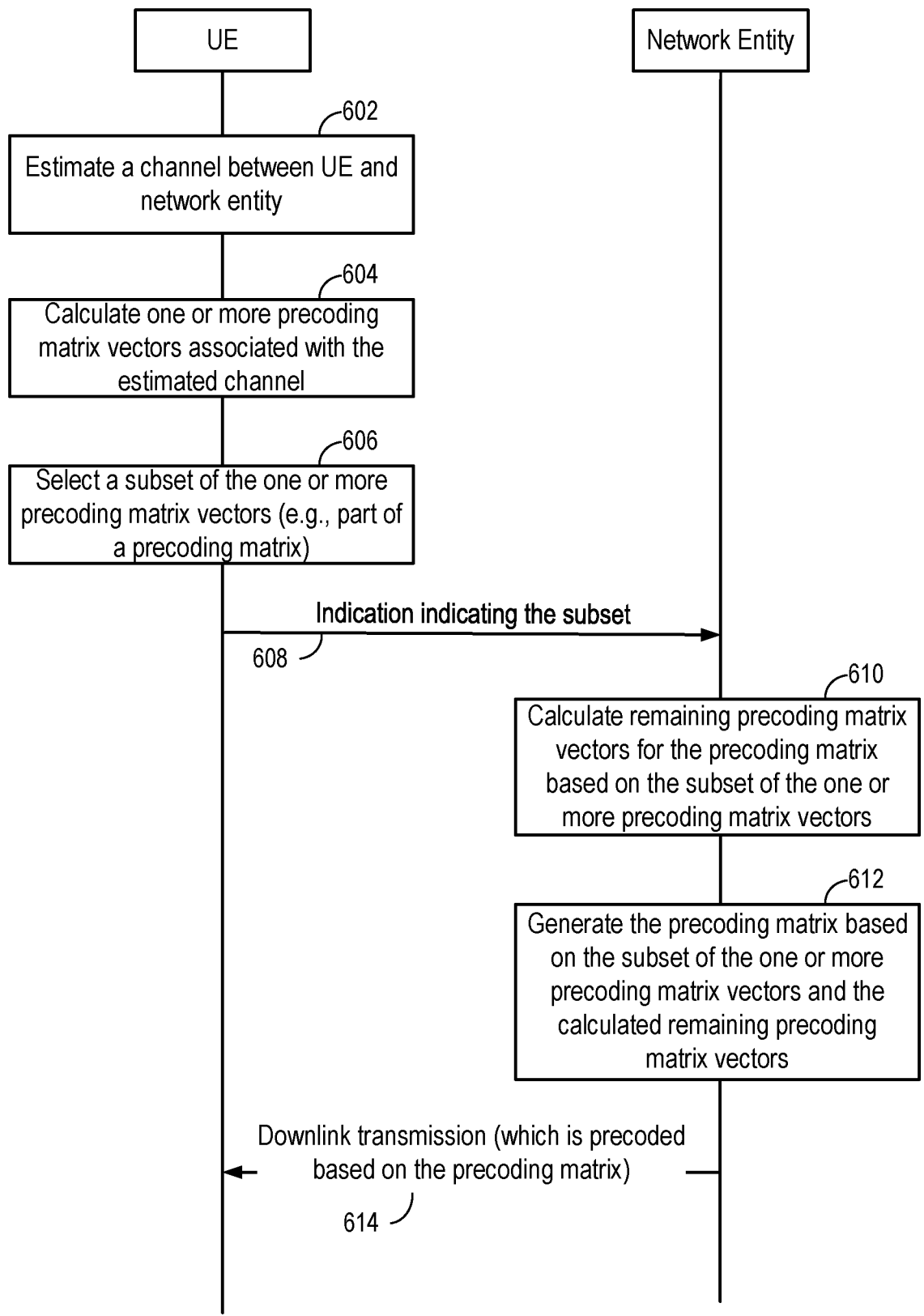
FIG. 6 depicts a call flow diagram illustrating example communication between a UE and a network entity.

As illustrated in FIG. 6, at 602, a UE (e.g., such as UE 104 in wireless communication network 100 of FIG. 1) estimates a channel between the UE and a network entity (e.g., such as BS 102 in wireless communication network 100 of FIG. 1).

At 604, the UE calculates one or more precoding matrix vectors associated with the estimated channel. For example, the one or more precoding matrix vectors may be singular value decomposition (SVD) precoding matrix vectors (e.g., eigen vectors).

At 606, the UE selects a subset of the one or more precoding matrix vectors (e.g., which are part of a precoding matrix).

In some cases, the UE may previously receive from the network entity an indication to save a predefined amount of precoder feedback data (e.g., save 50% precoder feedback data) to the network entity. In such cases, the UE may select the subset of one or more precoding matrix vectors based on the predefined amount of precoder feedback data that has to be saved (e.g., select two precoding matrix vectors out of total of four precoding matrix vectors). In one example, the UE may select the precoding matrix vectors associated with greater singular values $[v_1, \ldots v_k]$.

At 608, the UE transmits to the network entity an indication indicating the subset of the one or more precoding matrix vectors.

At 610, the network entity calculates remaining precoding matrix vectors for the precoding matrix based on the subset of the one or more precoding matrix vectors. For example, the network entity may deterministically calculate the remaining precoding matrix vectors, using a predetermined function based on the subset of one or more precoding matrix vectors (e.g., $f(v_1, \ldots, v_k)$).

At 612, the network entity generates the precoding matrix based on the subset of the one or more precoding matrix vectors and the calculated remaining precoding matrix vectors. The precoding matrix may correspond to a pseudo SVD precoding matrix.

At 614, the network entity performs precoding of a downlink transmission based on the precoding matrix, and then transmits the precoded downlink transmission to the UE.

Figure 7:
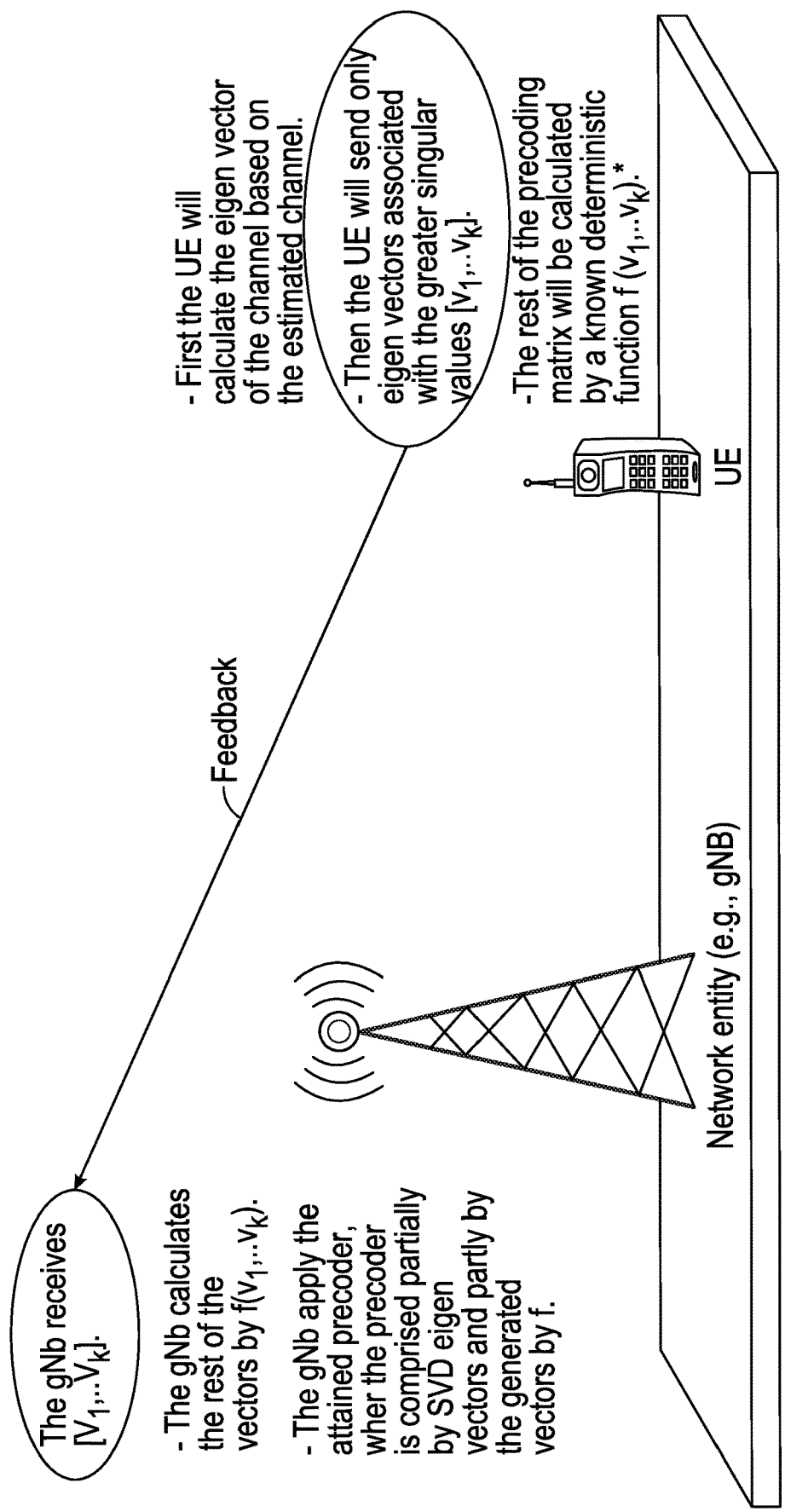
FIG. 7 depicts example communication between a UE and a network entity for generating a pseudo singular value decomposition (SVD) precoder.

In certain aspects, as illustrated in FIG. 7, the UE also calculates remaining precoding matrix vectors for the precoding matrix based on the subset of one or more precoding matrix vectors. For example, the UE may deterministically calculate the remaining precoding matrix vectors using the predetermined function (e.g., $f(v_1, \ldots, v_k)$), which is signaled to the UE by the network entity. The UE then generates the precoding matrix based on the subset of the one or more precoding matrix vectors and the remaining precoding matrix vectors.

In certain aspects, the network entity may transmit to the UE an indication to generate and transmit a full precoding matrix to the network entity. In such cases, the UE calculates all precoding matrix vectors required to generate the full precoding matrix based on the estimated channel. The UE then generates the full precoding matrix based on the calculated precoding matrix vectors. The UE then sends a feedback indicating the full precoding matrix to the network entity. The network entity will perform precoding of the downlink transmission based on the received precoding matrix, and transmit the precoded downlink transmission to the UE.

As noted above, to reduce an amount of precoder data quantity sent to a network entity via an uplink feedback, a UE transmits only some eigen vectors of a channel H (e.g., determined based on an estimated channel) to the network entity. In one aspect (e.g., pseudo1 SVD precoder), to save 75% of uplink feedback data transmission, the UE determines to transmit one eigen vector out of total of four eigen vectors of the channel. In another aspect (e.g., pseudo2 SVD precoder), to save 50% of the uplink feedback data transmission, the UE determines to transmit two eigen vectors out of total of four eigen vectors of the channel. In yet another aspect (e.g., pseudo3 SVD precoder), to save 25% of the uplink feedback data transmission, the UE determines to transmit three eigen vectors out of total of four eigen vectors of the channel.

In some cases, as noted above, when the UE determines to transmit two eigen vectors out of total of four eigen vectors of the channel (e.g., to save 50% of the uplink feedback data transmission), the UE selects and sends two eigen vectors $v_1$, $v_2$ (e.g., associated with greater singular values) to the network entity. The network entity is configured to perform precoding of downlink transmissions using the pseudo2 SVD precoder, which is based on equation 1. The equation 1 is represented as:

$$\tilde{V} = \begin{bmatrix} \vdots & \vdots & \vdots & \vdots \\ v_1 & v_2 & \tilde{v}_3 & \tilde{v}_4 \\ \vdots & \vdots & \vdots & \vdots \end{bmatrix}_{8 \times 4} \text{ where } V_{8 \times 8} = \begin{bmatrix} \vdots & \vdots & & \vdots \\ v_1 & v_2 & \ldots & v_8 \\ \vdots & \vdots & & \vdots \end{bmatrix} \quad \text{Equation 1}$$

In the above noted equation 1, $\langle v_i | \tilde{v}_j \rangle = 0$ for i=1, 2, j=3,4; $\tilde{v}_3 | \tilde{v}_4 \rangle = 0$; and $\langle \tilde{v}_j | \tilde{v}_j \rangle = 1$ for j=3,4.

In this example case, since the network entity only received the two eigen vectors $v_1$, $v_2$ from the UE, the network entity calculates other two eigen vectors $\tilde{v}_3$, $\tilde{v}_4$ to generate a full precoding matrix associated with the pseudo2 SVD precoder. The network entity calculates the other two eigen vectors $\tilde{v}_3$, $\tilde{v}_4$ based on the received two eigen vectors $v_1$, $v_2$ and using one or more predetermined functions (e.g., $\tilde{v}_3 = f_3(v_1, v_2)$, $\tilde{v}_4 = f_4(v_1, v_2)$). The network entity and the UE may communicate beforehand to select the one or more predetermined functions, which can be used by both the network entity and the UE to calculate the other two eigen vectors $v_3$, $v_4$. In certain aspects, there may be multiple number of possible functions $\tilde{v}_3$, $\tilde{v}_4$ that can be used to calculate the other two eigen vectors $\tilde{v}_3$, $\tilde{v}_4$. The network entity then generates and applies the pseudo2 SVD precoder, which is comprised of the received eigen vectors $v_1$, $v_2$ and the calculated eigen vectors $\tilde{v}_3$, $\tilde{v}_4$, on the downlink transmissions.

Figure 8:
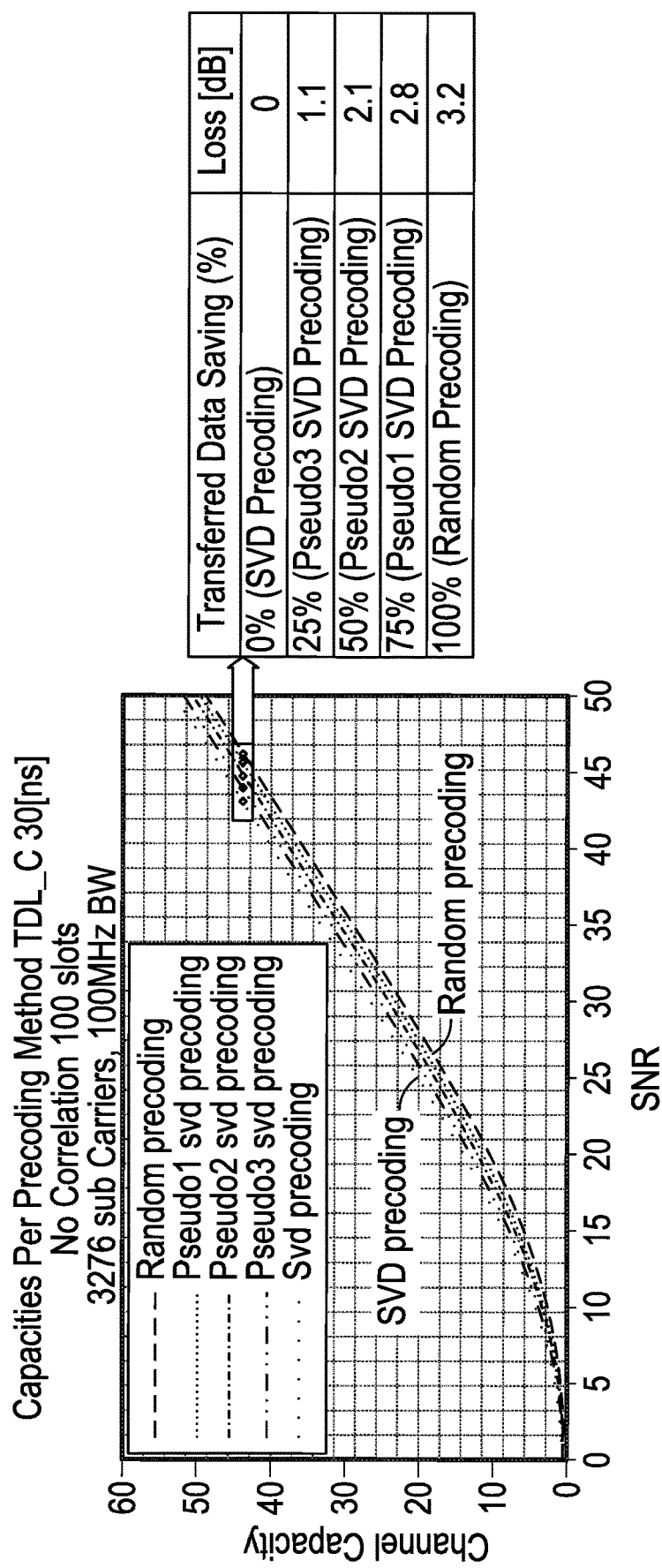
FIG. 8 depicts example channel capacity curves for different types of precoding methods.

FIG. 8 depicts example channel capacity curves associated with a channel between a UE and a network entity for different types of precoding methods. The different types of precoding methods include a random precoding method (e.g., based on without any information associated with the channel), a pseudo1 SVD precoding method noted above, a pseudo2 SVD precoding method noted above, a pseudo3 SVD precoding method noted above, and a SVD precoding method (e.g., based on a full precoding matrix associated with the channel received from a UE).

In this example case, the channel capacity curves are based on the channel, which is associated with a tapped delay line (TDL) channel model C (e.g., TDL_C). The channel has a delay spread of 30 nanosecond (ns) without any transmit or receive antennas correlation. The channel capacity in the channel capacity curves is an average of channel capacities over time (e.g., 100 slots) and frequencies (e.g., 100 megahertz (MHz)).

As illustrated in FIG. 8, when a network entity applies the random precoding method, a channel capacity is lowest (and signal to noise ratio (SNR) loss is highest) among channel capacities and SNR losses associated with all precoding methods. When the network entity applies the SVD precoding method, the channel capacity is highest (and SNR loss is lowest) among channel capacities and SNR losses associated with all precoding methods. When the network entity applies the pseudo1 SVD precoding method, the channel capacity is higher than that of the random precoding method but lower than all other precoding methods. At the same time, the SNR loss is lower than that of the random precoding method but higher than all other precoding methods. When the network entity applies the pseudo2 SVD precoding method, the channel capacity is higher than that of the random precoding method and the pseudo1 SVD precoding method but lower than that of the SVD precoding method and the pseudo3 SVD precoding method. At the same time, the SNR loss is lower than that of the random precoding method and the pseudo1 SVD precoding method but higher than that of the SVD precoding method and the pseudo3 SVD precoding method. When the network entity applies the pseudo3 SVD precoding method, the channel capacity is lower than that of the SVD precoding method but higher than that of all other precoding methods. At the same time, the SNR loss is higher than that of the SVD precoding method but lower than that of all other precoding methods.

Figure 9:
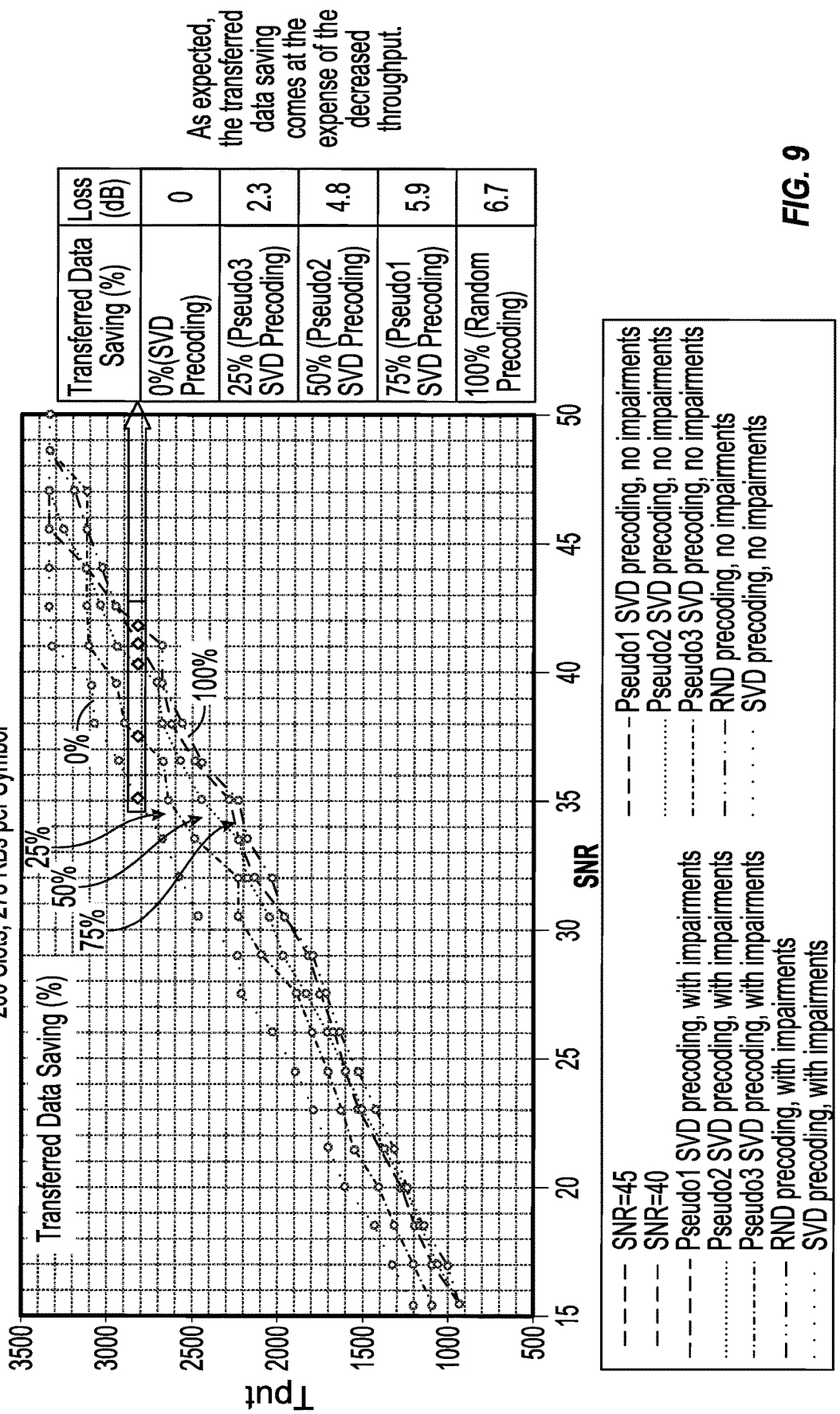
FIG. 9 depicts example throughput curves indicating throughput for different types of precoding methods without radio frequency (RF) impairments.
Figure 10:
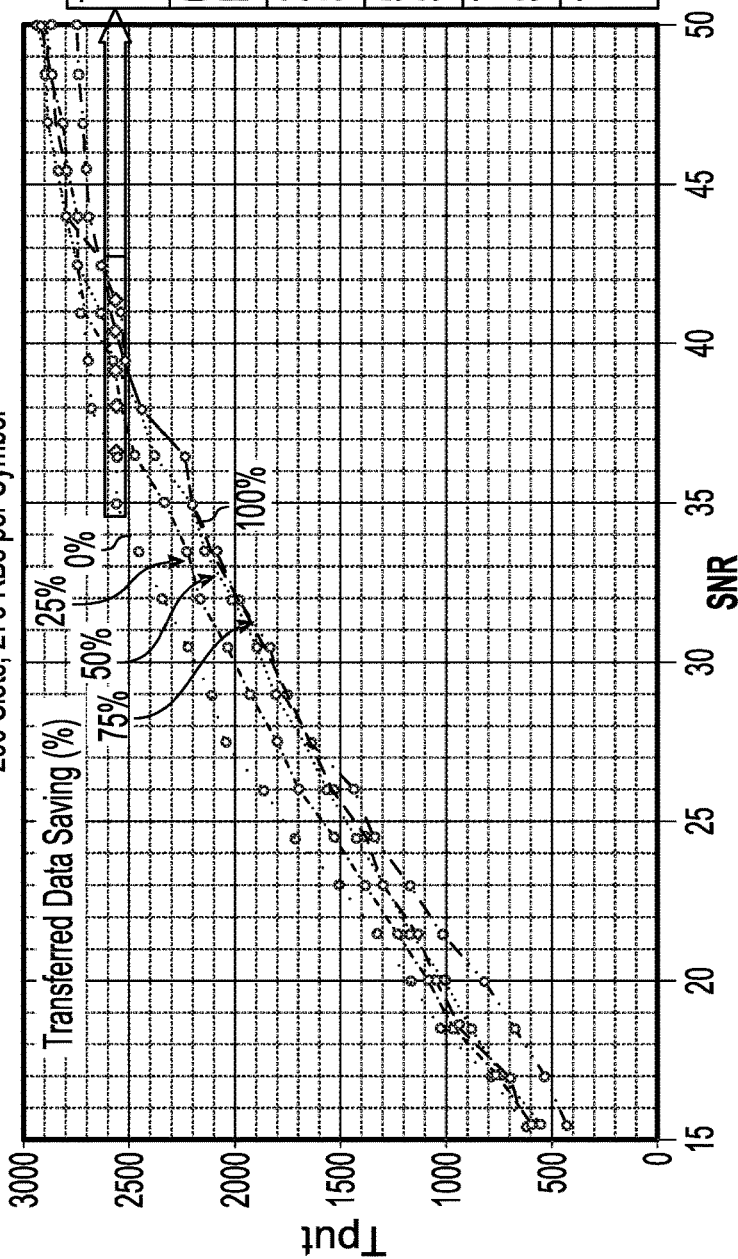
FIG. 10 depicts example throughput curves indicating throughput for different types of precoding methods with RF impairments.

FIGS. 9 and 10 depict example throughput curves for different types of precoding methods noted above such as a random precoding method (e.g., RND precoding method), a pseudo1 SVD precoding method, a pseudo2 SVD precoding method, a pseudo3 SVD precoding method, and a SVD precoding method.

In this example case, the throughput curves are based on a channel, which is associated with a TDL channel model B (e.g., TDL_B). The channel has a delay spread of 30 ns without transmit or receive antennas correlation. A throughput indicated in the throughput curves is an average of throughput over 200 slots. A number of resource blocks (RBs) is equal to 273. A subcarrier spacing (SCS) is equal to 30 KHz (100 MHz BW). A sampling rate is equal to 122.88 MHz. Radio frequency (RF) impairments include: transmitter phase noise is −46 integrated phase noise (IPN), receiver phase noise is −40 IPN, and nonlinearity solid state power amplifier (SSPA) high power amplifier (HPA) Rapp model is −31 decibels relative to a carrier (dBc).

As illustrated in FIG. 9, throughput curves indicate a throughput for the different types of precoding methods (e.g., without the RF impairments). For example, when a network entity applies the random precoding method, the throughput is lowest (and signal to noise ratio (SNR) loss is highest) among throughputs and SNR losses associated with all precoding methods. When the network entity applies the SVD precoding method, the throughput is highest (and SNR loss is lowest) among throughputs and SNR losses associated with all precoding methods. When the network entity applies the pseudo1 SVD precoding method, the throughput is higher than that of the random precoding method but lower than that of all other precoding methods. At the same time, the SNR loss is lower than that of the random precoding method but higher than that of all other precoding methods. When the network entity applies the pseudo2 SVD precoding method, the throughput is higher than that of the random precoding method and the pseudo1 SVD precoding method but lower than that of the SVD precoding method and the pseudo3 SVD precoding method. At the same time, the SNR loss is lower than that of the random precoding method and the pseudo1 SVD precoding method but higher than that of the SVD precoding method and the pseudo3 SVD precoding method. When the network entity applies the pseudo3 SVD precoding method, the throughput is lower than that of the SVD precoding method but higher than that of all other precoding methods. At the same time, the SNR loss is higher than that of the SVD precoding method but lower than that of all other precoding methods.

As illustrated in FIG. 10 throughput curves indicate throughput for the different types of precoding methods (e.g., with the RF impairments). For example, when a network entity applies the random precoding method, the throughput is lowest (and SNR loss is highest) among throughputs and SNR losses associated with all precoding methods. When the network entity applies the SVD precoding method, the throughput is highest (and SNR loss is lowest) among throughputs and SNR losses associated with all precoding methods. When the network entity applies the pseudo1 SVD precoding method, the throughput is higher than that of the random precoding method but lower than that of all other precoding methods. At the same time, the SNR loss is lower than that of the random precoding method but higher than that of all other precoding methods. When the network entity applies the pseudo2 SVD precoding method, the throughput is higher than that of the random precoding method and the pseudo1 SVD precoding method but lower than that of the SVD precoding method and the pseudo3 SVD precoding method. At the same time, the SNR loss is lower than that of the random precoding method and the pseudo1 SVD precoding method but higher than that of the SVD precoding method and the pseudo3 SVD precoding method. When the network entity applies the pseudo3 SVD precoding method, the throughput is lower than that of the SVD precoding method but higher than that of all other precoding methods. At the same time, the SNR loss is higher than that of the SVD precoding method but lower than that of all other precoding methods.

As noted in FIG. 10, with presence of the RF impairments, the throughput is less affected by transferred data saving based on the different types of precoding methods, in comparison to the throughput indicated in FIG. 9 without the presence of the RF impairments.

Example Operations of a Network Entity

FIG. 11 illustrates example operations 1100 for wireless communication. The operations 1100 may be performed, for example, by a network entity (e.g., such as BS 102 in wireless communication network 100 of FIG. 1). The operations 1100 may be implemented as software components that are executed and run on one or more processors (e.g., controller/processor 340 of FIG. 3). Further, transmission and reception of signals by the network entity in the operations 1100 may be enabled, for example, by one or more antennas (e.g., antennas 334 of FIG. 3). In certain aspects, the transmission and/or reception of signals by the network entity may be implemented via a bus interface of one or more processors (e.g., the controller/processor 340) obtaining and/or outputting signals.

The operations 1100 begin, at 1102, by receiving an indication indicating a subset of one or more precoding matrix vectors associated with an estimated channel between a user equipment (UE) and the network entity. The subset of one or more precoding matrix vectors are part of a precoding matrix. For example, the network entity may receive the indication, using antenna(s) and/or receiver/transceiver components of BS 102 shown in FIG. 1 or FIG. 3 and/or of the apparatus shown in FIG. 13.

At 1104, the network entity calculates remaining precoding matrix vectors for the precoding matrix, based on the subset of one or more precoding matrix vectors. For example, the network entity may calculate the remaining precoding matrix vectors for the precoding matrix, using a processor of BS 102 shown in FIG. 1 or FIG. 3 and/or of the apparatus shown in FIG. 13.

At 1106, the network entity generates the precoding matrix based on the subset of one or more precoding matrix vectors and the remaining precoding matrix vectors. For example, the network entity may generate the precoding matrix, using a processor of BS 102 shown in FIG. 1 or FIG. 3 and/or of the apparatus shown in FIG. 13.

At 1108, the network entity performs precoding of a downlink transmission based on the precoding matrix. For example, the network entity may perform the precoding of the downlink transmission, using a processor, antenna(s) and/or transceiver components of BS 102 shown in FIG. 1 or FIG. 3 and/or of the apparatus shown in FIG. 13.

Note that FIG. 11 is just one example of a method, and other methods including fewer, additional, or alternative steps are possible consistent with this disclosure.

Example Operations of a User Equipment (UE)

FIG. 12 illustrates example operations 1200 for wireless communication. The operations 1200 may be performed, for example, by a user equipment (UE) (e.g., such as UE 104 in wireless communication network 100 of FIG. 1). The operations 1200 may be implemented as software components that are executed and run on one or more processors (e.g., controller/processor 380 of FIG. 3). Further, transmission and reception of signals by the UE in the operations 1200 may be enabled, for example, by one or more antennas (e.g., antennas 352 of FIG. 3). In certain aspects, the transmission and/or reception of signals by the UE may be implemented via a bus interface of one or more processors (e.g., the controller/processor 380) obtaining and/or outputting signals.

The operations 1200 begin, at 1202, by estimating a channel between the UE and a network entity. For example, the UE may estimate the channel, using a processor, antenna(s) and/or transceiver components of UE 104 shown in FIG. 1 or FIG. 3 and/or of the apparatus shown in FIG. 14.

At 1204, the UE calculates one or more precoding matrix vectors associated with the estimated channel. For example, the UE may calculate the one or more precoding matrix vectors, using a processor of UE 104 shown in FIG. 1 or FIG. 3 and/or of the apparatus shown in FIG. 14.

At 1206, the UE selects a subset of the one or more precoding matrix vectors. The subset of the one or more precoding matrix vectors are part of a precoding matrix. For example, the UE may select the subset of the one or more precoding matrix vectors, using a processor of UE 104 shown in FIG. 1 or FIG. 3 and/or of the apparatus shown in FIG. 14.

At 1208, the UE calculates remaining precoding matrix vectors for the precoding matrix, based on the subset of the one or more precoding matrix vectors. For example, the UE may calculate the remaining precoding matrix vectors for the precoding matrix, using a processor of UE 104 shown in FIG. 1 or FIG. 3 and/or of the apparatus shown in FIG. 14.

At 1210, the UE generates the precoding matrix based on the subset of the one or more precoding matrix vectors and the remaining precoding matrix vectors. For example, the UE may generate the precoding matrix, using a processor of UE 104 shown in FIG. 1 or FIG. 3 and/or of the apparatus shown in FIG. 14.

Note that FIG. 12 is just one example of a method, and other methods including fewer, additional, or alternative steps are possible consistent with this disclosure.

Example Communications Devices

Figure 13:
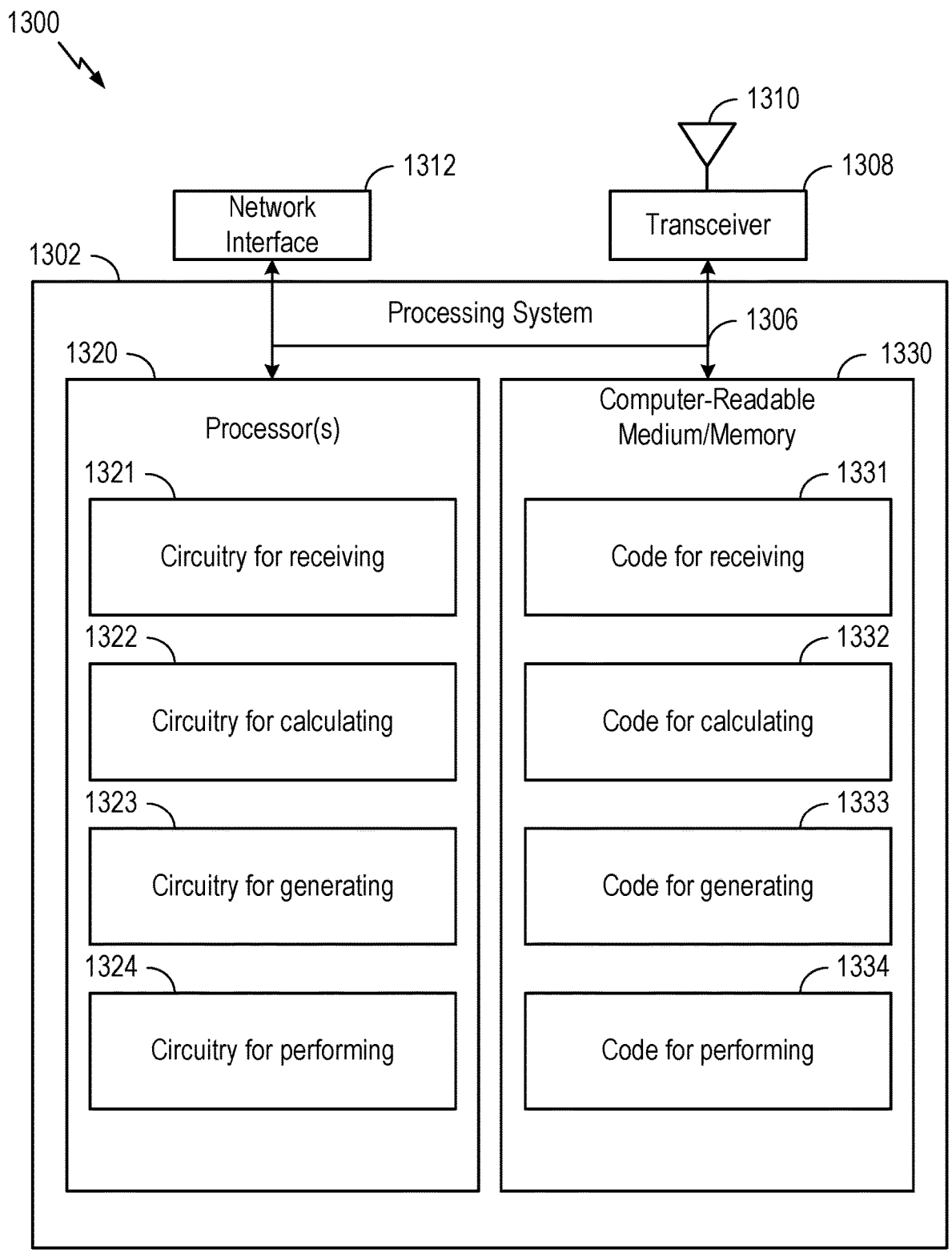
FIG. 13 depicts aspects of an example communications device.

FIG. 13 depicts aspects of an example communications device 1300. In some aspects, communications device 1300 is a network entity, such as BS 102 described above with respect to FIGS. 1 and 3.

The communications device 1300 includes a processing system 1302 coupled to a transceiver 1308 (e.g., a transmitter and/or a receiver) and/or a network interface. The transceiver 1308 is configured to transmit and receive signals for the communications device 1300 via an antenna 1310, such as the various signals as described herein. The network interface 1312 is configured to obtain and send signals for the communications device 1300 via communications link(s), such as a backhaul link, midhaul link, and/or fronthaul link as described herein, such as with respect to FIG. 2. The processing system 1302 may be configured to perform processing functions for the communications device 1300, including processing signals received and/or to be transmitted by the communications device 1300.

The processing system 1302 includes one or more processors 1320. In various aspects, one or more processors 1320 may be representative of one or more of receive processor 338, transmit processor 320, TX MIMO processor 330, and/or controller/processor 340, as described with respect to FIG. 3. The one or more processors 1320 are coupled to a computer-readable medium/memory 1330 via a bus 1306. In certain aspects, the computer-readable medium/memory 1330 is configured to store instructions (e.g., computer-executable code) that when executed by the one or more processors 1320, cause the one or more processors 1320 to perform the operations 1100 described with respect to FIG. 11, or any aspect related to it. Note that reference to a processor of communications device 1300 performing a function may include one or more processors of communications device 1300 performing that function.

In the depicted example, the computer-readable medium/memory 1330 stores code (e.g., executable instructions) for receiving 1331 comprising code for receiving an indication indicating a subset of one or more precoding matrix vectors associated with an estimated channel between a user equipment (UE) and the network entity where the subset of one or more precoding matrix vectors are part of a precoding matrix, code for calculating 1332 comprising code for calculating remaining precoding matrix vectors for the precoding matrix based on the subset of one or more precoding matrix vectors, code for generating 1333 comprising code for generating the precoding matrix based on the subset of one or more precoding matrix vectors and the remaining precoding matrix vectors, and code for performing 1334 comprising code for performing precoding of a downlink transmission based on the precoding matrix. Processing of the code 1331-1334 may cause the communications device 1300 to perform the operations 1100 described with respect to FIG. 11, or any aspect related to it.

The one or more processors 1320 include circuitry configured to implement (e.g., execute) the code stored in the computer-readable medium/memory 1330, including circuitry for receiving 1321 comprising circuitry for receiving an indication indicating a subset of one or more precoding matrix vectors associated with an estimated channel between a UE and the network entity where the subset of one or more precoding matrix vectors are part of a precoding matrix, circuitry for calculating 1322 comprising circuitry for calculating remaining precoding matrix vectors for the precoding matrix based on the subset of one or more precoding matrix vectors, circuitry for generating 1323 comprising circuitry for generating the precoding matrix based on the subset of one or more precoding matrix vectors and the remaining precoding matrix vectors, and circuitry for performing 1324 comprising circuitry for performing precoding of a downlink transmission based on the precoding matrix.

Processing with circuitry 1321-1324 may cause the communications device 1300 to perform the operations 1100 as described with respect to FIG. 11, or any aspect related to it.

Various components of the communications device 1300 may provide means for performing the operations 1100 as described with respect to FIG. 11, or any aspect related to it. Means for transmitting, sending or outputting for transmission may include the transceivers 332 and/or antenna(s) 334 of the BS 102 illustrated in FIG. 3 and/or transceiver 1308 and antenna 1310 of the communications device 1300 in FIG. 13. Means for receiving or obtaining may include the transceivers 332 and/or antenna(s) 334 of the BS 102 illustrated in FIG. 3 and/or transceiver 1308 and antenna 1310 of the communications device 1300 in FIG. 13.

Figure 14:
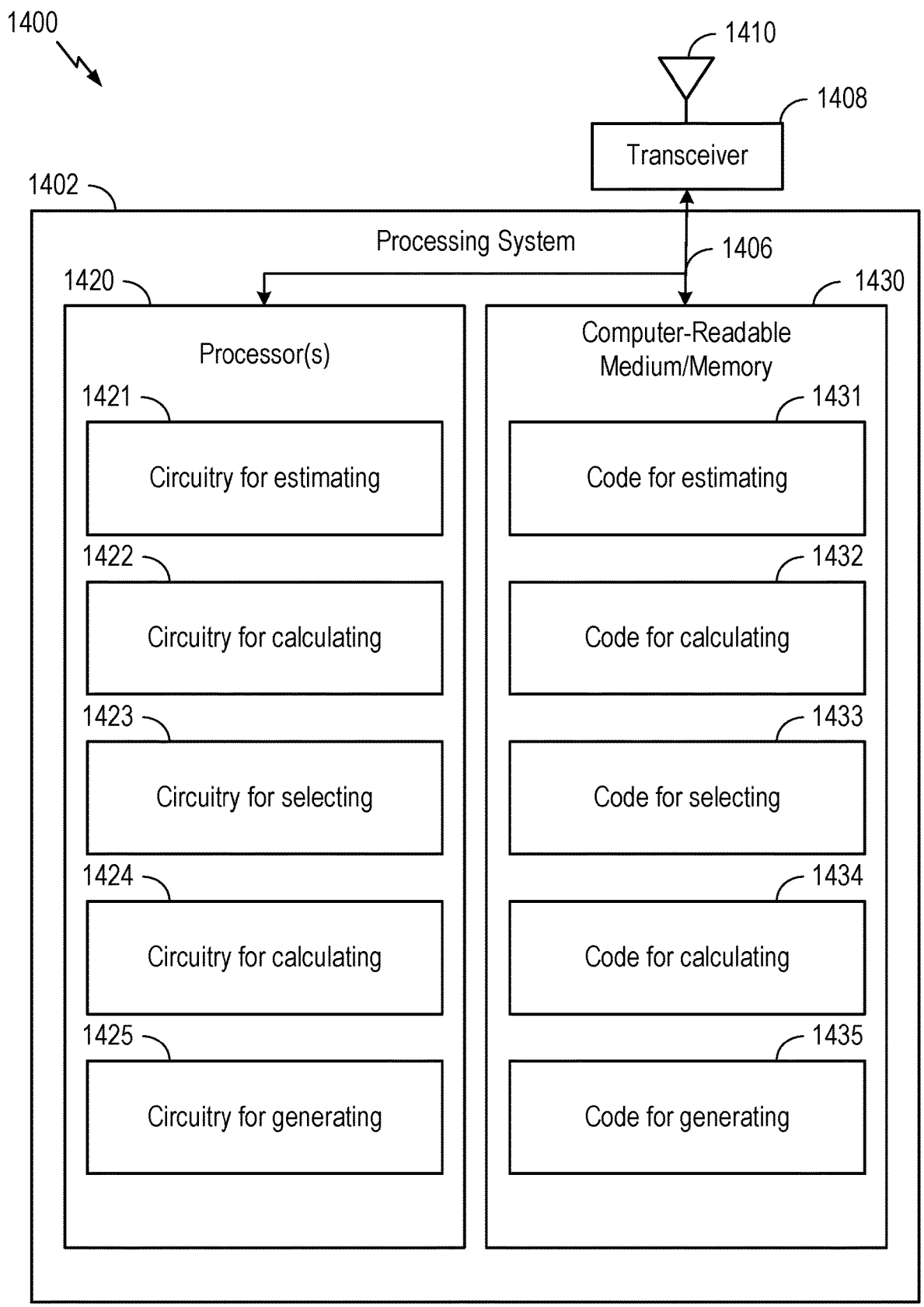
FIG. 14 depicts aspects of an example communications device.

FIG. 14 depicts aspects of an example communications device 1400. In some aspects, communications device 1400 is a UE, such as UE 104 described above with respect to FIGS. 1 and 3.

The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes one or more processors 1420. In various aspects, the one or more processors 1420 may be representative of one or more of receive processor 358, transmit processor 364, TX MIMO processor 366, and/or controller/processor 380, as described with respect to FIG. 3. The one or more processors 1420 are coupled to a computer-readable medium/memory 1430 via a bus 1406. In certain aspects, the computer-readable medium/memory 1430 is configured to store instructions (e.g., computer-executable code) that when executed by the one or more processors 1420, cause the one or more processors 1420 to perform the operations 1200 described with respect to FIG. 12, or any aspect related to it. Note that reference to a processor performing a function of communications device 1400 may include one or more processors performing that function of communications device 1400.

In the depicted example, computer-readable medium/memory 1430 stores code (e.g., executable instructions) for estimating 1431 comprising code for estimating a channel between the UE and a network entity, code for calculating 1432 comprising code for calculating one or more precoding matrix vectors associated with the estimated channel, code for selecting 1433 comprising code for selecting a subset of the one or more precoding matrix vectors where the subset of the one or more precoding matrix vectors are part of a precoding matrix, code for calculating 1343 comprising code for calculating remaining precoding matrix vectors for the precoding matrix based on the subset of the one or more precoding matrix vectors, and code for generating 1435 comprising code for generating the precoding matrix based on the subset of the one or more precoding matrix vectors and the remaining precoding matrix vectors. Processing of the code 1431-1435 may cause the communications device 1400 to perform the operations 1200 described with respect to FIG. 12, or any aspect related to it.

The one or more processors 1420 include circuitry configured to implement (e.g., execute) the code stored in the computer-readable medium/memory 1430, including circuitry for estimating 1421 comprising circuitry for estimating a channel between the UE and a network entity, circuitry for calculating 1422 comprising circuitry for calculating one or more precoding matrix vectors associated with the estimated channel, circuitry for selecting 1423 comprising circuitry for selecting a subset of the one or more precoding matrix vectors where the subset of the one or more precoding matrix vectors are part of a precoding matrix, circuitry for calculating 1424 comprising circuitry for calculating remaining precoding matrix vectors for the precoding matrix based on the subset of the one or more precoding matrix vectors, and circuitry for generating 1425 comprising circuitry for generating the precoding matrix based on the subset of the one or more precoding matrix vectors and the remaining precoding matrix vectors. Processing with circuitry 1421-1425 may cause the communications device 1400 to perform the operations 1200 described with respect to FIG. 12, or any aspect related to it.

Various components of the communications device 1400 may provide means for performing the operations 1200 described with respect to FIG. 12, or any aspect related to it. For example, means for transmitting, sending or outputting for transmission may include the transceivers 354 and/or antenna(s) 352 of the UE 104 illustrated in FIG. 3 and/or transceiver 1408 and antenna 1410 of the communications device 1400 in FIG. 14. Means for receiving or obtaining may include the transceivers 354 and/or antenna(s) 352 of the UE 104 illustrated in FIG. 3 and/or transceiver 1408 and antenna 1410 of the communications device 1400 in FIG. 14.

Example Clauses

Implementation examples are described in the following numbered clauses:

Clause 1: A method for wireless communications by a network entity, comprising: receiving an indication indicating a subset of one or more precoding matrix vectors associated with an estimated channel between a user equipment (UE) and the network entity, wherein the subset of one or more precoding matrix vectors are part of a precoding matrix; calculating remaining precoding matrix vectors for the precoding matrix, based on the subset of one or more precoding matrix vectors; generating the precoding matrix based on the subset of one or more precoding matrix vectors and the remaining precoding matrix vectors; and performing precoding of a downlink transmission based on the precoding matrix.

Clause 2: The method alone or in combination with the first clause, wherein the calculating comprises deterministically calculating the remaining precoding matrix vectors, using a predetermined function, based on the subset of one or more precoding matrix vectors.

Clause 3: The method alone or in combination with the first clause, further comprising transmitting, to the UE, an indication to generate and transmit the precoding matrix to the network entity.

Clause 4: The method alone or in combination with the first clause, further comprising transmitting, to the UE, an indication to save a predefined amount of precoder feedback data to the network entity.

Clause 5: The method alone or in combination with the fourth clause, wherein the subset of one or more precoding matrix vectors are selected based on the predefined amount of precoder feedback data.

Clause 6: The method alone or in combination with the first clause, further comprising transmitting, to the UE, an indication indicating a predetermined function.

Clause 7: The method alone or in combination with the first clause, wherein the subset of one or more precoding matrix vectors correspond to singular value decomposition (SVD) precoding vectors.

Clause 8: The method alone or in combination with the first clause, wherein the precoding matrix corresponds to a pseudo singular value decomposition (SVD) precoding matrix.

Clause 9: A method for wireless communications by a user equipment (UE), comprising: estimating a channel between the UE and a network entity; calculating one or more precoding matrix vectors associated with the estimated channel; selecting a subset of the one or more precoding matrix vectors, wherein the subset of the one or more precoding matrix vectors are part of a precoding matrix; calculating remaining precoding matrix vectors for the precoding matrix, based on the subset of the one or more precoding matrix vectors; and generating the precoding matrix based on the subset of the one or more precoding matrix vectors and the remaining precoding matrix vectors.

Clause 10: The method alone or in combination with the ninth clause, further comprising transmitting, to the network entity, an indication indicating the subset of the one or more precoding matrix vectors.

Clause 11: The method alone or in combination with the ninth clause, further comprising receiving, from the network entity, an indication indicating a predetermined function.

Clause 12: The method alone or in combination with the eleventh clause, wherein the calculating comprises deterministically calculating the remaining precoding matrix vectors, using the predetermined function, based on the subset of the one or more precoding matrix vectors.

Clause 13: The method alone or in combination with the ninth clause, further comprising receiving, from the network entity, an indication to generate and transmit the precoding matrix to the network entity.

Clause 14: The method alone or in combination with the ninth clause, further comprising receiving, from the network entity, an indication to save a predefined amount of precoder feedback data to the network entity.

Clause 15: The method alone or in combination with the fourteenth clause, wherein the selecting comprises selecting the subset of the one or more precoding matrix vectors based on the predefined amount of precoder feedback data.

Clause 16: The method alone or in combination with the ninth clause, wherein the subset of the one or more precoding matrix vectors correspond to singular value decomposition (SVD) precoding vectors.

Clause 17: The method alone or in combination with the ninth clause, wherein the precoding matrix corresponds to a pseudo singular value decomposition (SVD) precoding matrix.

Clause 18: An apparatus, comprising: a memory comprising executable instructions; and a processor configured to execute the executable instructions and cause the apparatus to perform a method in accordance with any one of Clauses 1-17.

Clause 19: An apparatus, comprising means for performing a method in accordance with any one of Clauses 1-17.

Clause 20: A non-transitory computer-readable medium comprising executable instructions that, when executed by a processor of an apparatus, cause the apparatus to perform a method in accordance with any one of Clauses 1-17.

Clause 21: A computer program product embodied on a computer-readable storage medium comprising code for performing a method in accordance with any one of Clauses 1-17.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A network entity configured for wireless communications, comprising:
   a memory comprising computer-executable instructions; and
   a processor configured to execute the computer-executable instructions and cause the network entity to:
   receive an indication indicating a subset of one or more precoding matrix vectors associated with an estimated channel between a user equipment (UE) and the network entity, wherein the subset of one or more precoding matrix vectors are part of a precoding matrix;
   calculate remaining precoding matrix vectors for the precoding matrix, based on the subset of one or more precoding matrix vectors;
   generate the precoding matrix based on the subset of one or more precoding matrix vectors and the remaining precoding matrix vectors; and
   perform precoding of a downlink transmission based on the precoding matrix.

2. The network entity of claim 1, wherein the calculate comprises deterministically calculate the remaining precoding matrix vectors, using a predetermined function, based on the subset of one or more precoding matrix vectors.

3. The network entity of claim 1, wherein the processor is further configured to execute the computer-executable instructions and cause the network entity to: transmit, to the UE, an indication to generate and transmit the precoding matrix to the network entity.

4. The network entity of claim 1, wherein the processor is further configured to execute the computer-executable instructions and cause the network entity to: transmit, to the UE, an indication to save a predefined amount of precoder feedback data to the network entity.

5. The network entity of claim 4, wherein the subset of one or more precoding matrix vectors are selected based on the predefined amount of precoder feedback data.

6. The network entity of claim 1, wherein the processor is further configured to execute the computer-executable instructions and cause the network entity to: transmit, to the UE, an indication indicating a predetermined function.

7. The network entity of claim 1, wherein the subset of one or more precoding matrix vectors correspond to singular value decomposition (SVD) precoding vectors.

8. The network entity of claim 1, wherein the precoding matrix corresponds to a pseudo singular value decomposition (SVD) precoding matrix.

9. A user equipment (UE) configured for wireless communications, comprising:
   a memory comprising computer-executable instructions; and
   a processor configured to execute the computer-executable instructions and cause the UE to:
   estimate a channel between the UE and a network entity;
   calculate one or more precoding matrix vectors associated with the estimated channel;
   select a subset of the one or more precoding matrix vectors, wherein the subset of the one or more precoding matrix vectors are part of a precoding matrix;
   calculate remaining precoding matrix vectors for the precoding matrix, based on the subset of the one or more precoding matrix vectors; and
   generate the precoding matrix based on the subset of the one or more precoding matrix vectors and the remaining precoding matrix vectors.

10. The UE of claim 9, wherein the processor is further configured to execute the computer-executable instructions and cause the UE to: transmit, to the network entity, an indication indicating the subset of the one or more precoding matrix vectors.

11. The UE of claim 9, wherein the processor is further configured to execute the computer-executable instructions and cause the UE to: receive, from the network entity, an indication indicating a predetermined function.

12. The UE of claim 11, wherein the calculate comprises deterministically calculate the remaining precoding matrix vectors, using the predetermined function, based on the subset of the one or more precoding matrix vectors.

13. The UE of claim 9, wherein the processor is further configured to execute the computer-executable instructions and cause the UE to: receive, from the network entity, an indication to generate and transmit the precoding matrix to the network entity.

14. The UE of claim 9, wherein the processor is further configured to execute the computer-executable instructions and cause the UE to: receive, from the network entity, an indication to save a predefined amount of precoder feedback data to the network entity.

15. The UE of claim 14, wherein the select comprises select the subset of the one or more precoding matrix vectors based on the predefined amount of precoder feedback data.

16. The UE of claim 9, wherein the subset of the one or more precoding matrix vectors correspond to singular value decomposition (SVD) precoding vectors.

17. The UE of claim 9, wherein the precoding matrix corresponds to a pseudo singular value decomposition (SVD) precoding matrix.

18. A method for wireless communications by a network entity, comprising:
  receiving an indication indicating a subset of one or more precoding matrix vectors associated with an estimated channel between a user equipment (UE) and the network entity, wherein the subset of one or more precoding matrix vectors are part of a precoding matrix;
  calculating remaining precoding matrix vectors for the precoding matrix, based on the subset of one or more precoding matrix vectors;
  generating the precoding matrix based on the subset of one or more precoding matrix vectors and the remaining precoding matrix vectors; and
  performing precoding of a downlink transmission based on the precoding matrix.

19. The method of claim 18, wherein the calculating comprises deterministically calculating the remaining precoding matrix vectors, using a predetermined function, based on the subset of one or more precoding matrix vectors.

20. The method of claim 18, further comprising transmitting, to the UE, an indication to generate and transmit the precoding matrix to the network entity.

21. The method of claim 18, further comprising transmitting, to the UE, an indication to save a predefined amount of precoder feedback data to the network entity, wherein the subset of one or more precoding matrix vectors are selected based on the predefined amount of precoder feedback data.

22. The method of claim 18, further comprising transmitting, to the UE, an indication indicating a predetermined function.

23. The method of claim 18, wherein the subset of one or more precoding matrix vectors correspond to singular value decomposition (SVD) precoding vectors.

24. The method of claim 18, wherein the precoding matrix corresponds to a pseudo singular value decomposition (SVD) precoding matrix.

25. A method for wireless communications by a user equipment (UE), comprising:
  estimating a channel between the UE and a network entity;
  calculating one or more precoding matrix vectors associated with the estimated channel;
  selecting a subset of the one or more precoding matrix vectors, wherein the subset of the one or more precoding matrix vectors are part of a precoding matrix;
  calculating remaining precoding matrix vectors for the precoding matrix, based on the subset of the one or more precoding matrix vectors; and
  generating the precoding matrix based on the subset of the one or more precoding matrix vectors and the remaining precoding matrix vectors.

26. The method of claim 25, further comprising transmitting, to the network entity, an indication indicating the subset of the one or more precoding matrix vectors.

27. The method of claim 25, further comprising receiving, from the network entity, an indication indicating a predetermined function.

28. The method of claim 27, wherein the calculating comprises deterministically calculating the remaining precoding matrix vectors, using the predetermined function, based on the subset of the one or more precoding matrix vectors.

29. The method of claim 25, further comprising receiving, from the network entity, an indication to generate and transmit the precoding matrix to the network entity.

30. The method of claim 25, further comprising receiving, from the network entity, an indication to save a predefined amount of precoder feedback data to the network entity.

* * * * *